July 17, 1928.  1,677,564
H. S. MURRAY
AUTOMATIC COOKER
Original Filed Jan. 16, 1924   3 Sheets-Sheet 2
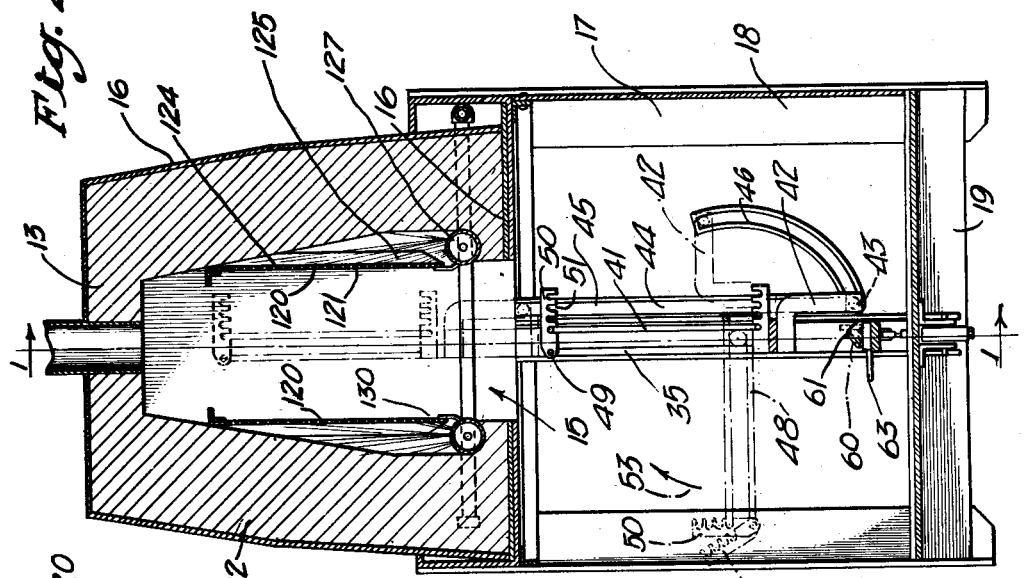
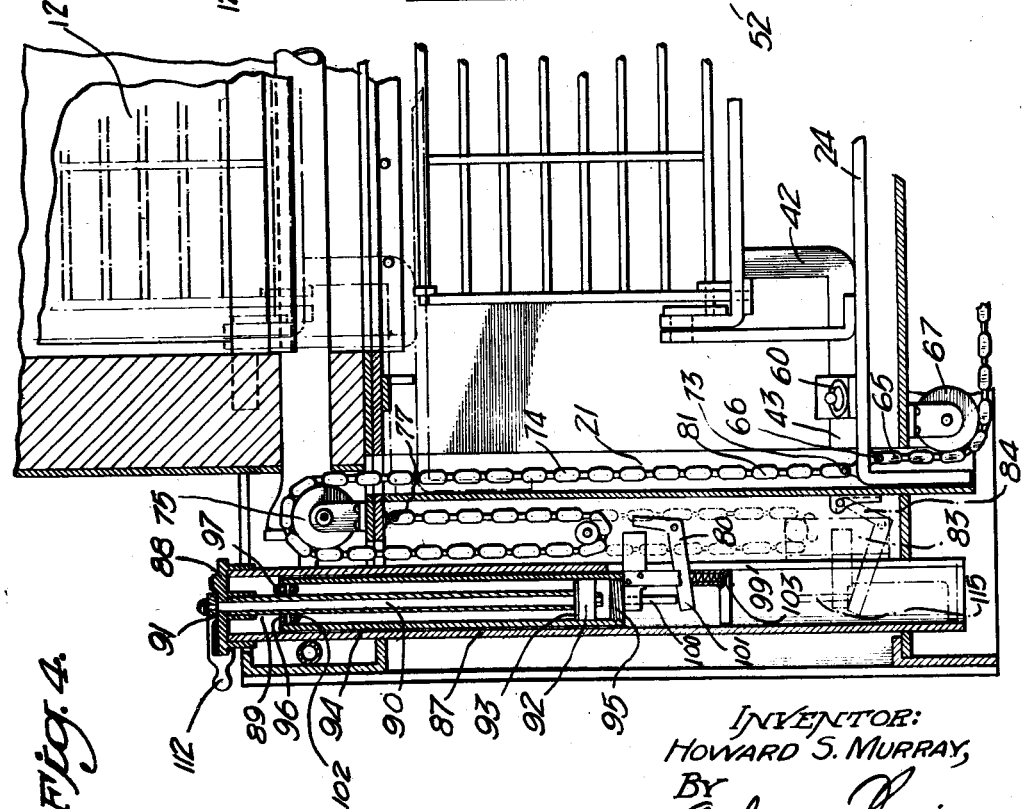
INVENTOR:
HOWARD S. MURRAY,
BY
ATTORNEYS.

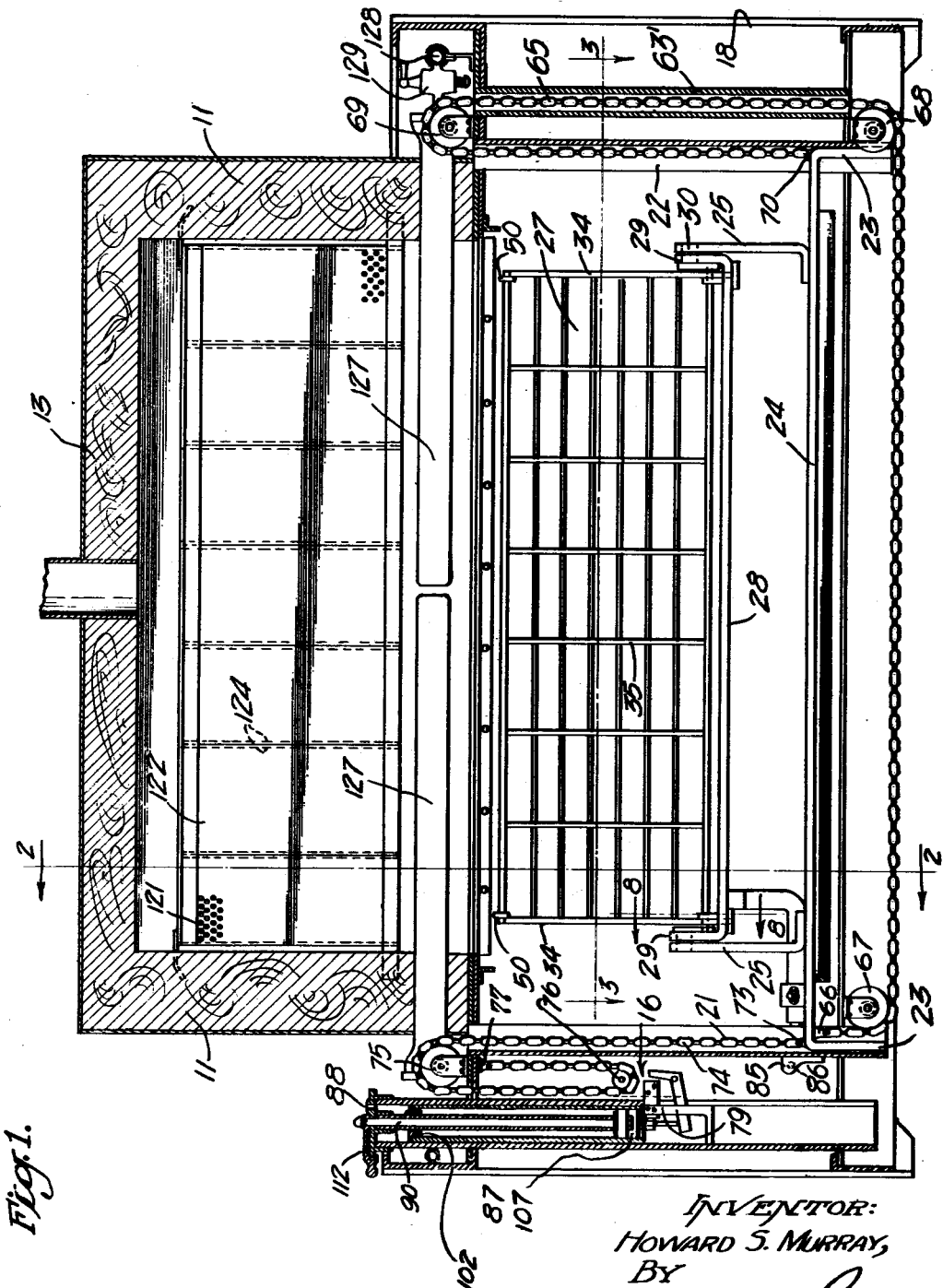

July 17, 1928.
H. S. MURRAY
AUTOMATIC COOKER
Original Filed Jan. 16, 1924    3 Sheets-Sheet 3
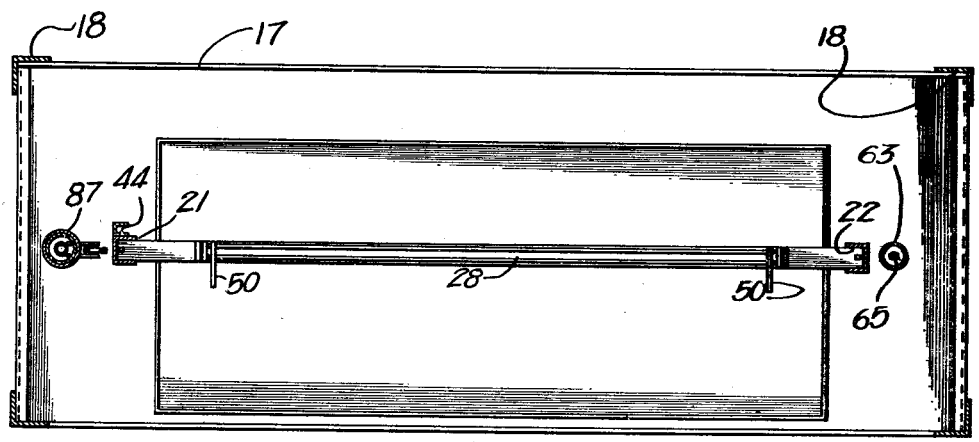
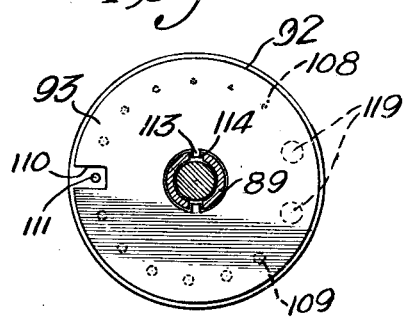
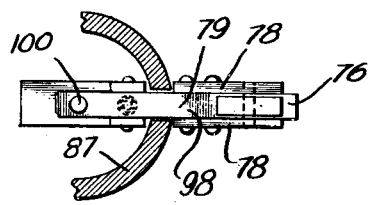
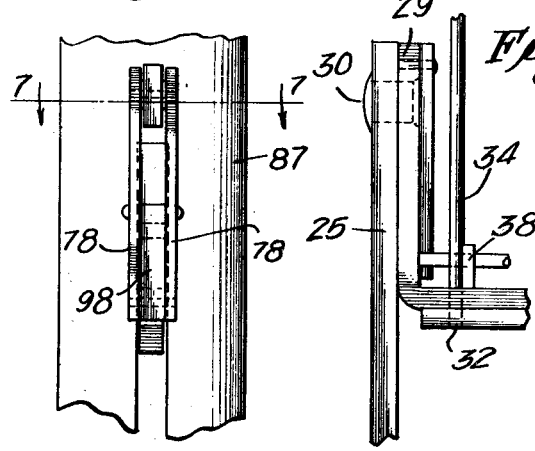
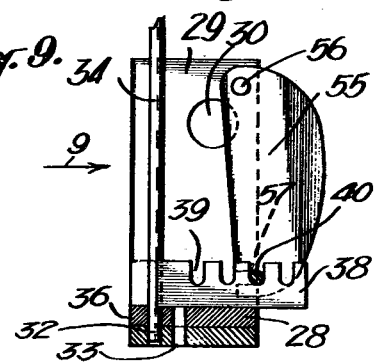
INVENTOR:
HOWARD S. MURRAY,
BY
Graham + Harris
ATTORNEYS.

Patented July 17, 1928.

1,677,564

UNITED STATES PATENT OFFICE.

HOWARD S. MURRAY, OF LOS ANGELES, CALIFORNIA.

AUTOMATIC COOKER.

Application filed January 16, 1924, Serial No. 686,523. Renewed January 9, 1928.

This invention relates to a device whereby articles of food may be cooked by the application of heat for a designated period of time. The invention is particularly adapted to use as a broiler for meats or as a device for toasting bread or other food articles.

It is an object of the invention to provide a device having a cooking chamber and a carriage arranged to enter this cooking chamber, such carriage being adapted to hold the article of food in position exposed to heat, and automatic means for removing the carriage from the cooking chamber after a designated period of time has elapsed.

It is a further object of the invention to provide a device of this character having an improved means for producing an incandescent radiation of heat within the cooking chamber. The invention may be employed in various forms. The following specification disclosing the invention embodied in a broiler for meats will fully present the features thereof.

A cut of meat such as a steak requires an intensity and duration of heat application corresponding to the thickness thereof. In the frying of the steak, this time may be ten to thirty-five minutes, depending upon the thickness. My invention is arranged to apply the heat for cooking in the form of incandescent heat radiations which penetrate into the meat, thus cooking the interior instead of merely applying a surface heat as is done in pan frying. By the application of incandescent heat, it is possible to broil in four to seven minutes the steaks, which now take from fifteen to twenty-five minutes to fry. It will be recognized that this saving of time is productive of considerable economy to the food vender and makes a considerable saving of time by the patron, as his order may be quickly prepared.

In cafeterias and similar places, where quantities of food are prepared in advance, a great many steaks and chops are fried in advance, this frying of steaks and chops due to the long period through which the heat must be applied on the stove must be started a considerable time before the meal hour. My meat broiler is arranged to receive a number of meat articles to be cooked, in a horizontal grid member which is then raised into vertical position and lifted upwardly into the broiler chamber wherein the articles held in the grid are exposed to incandescent heat radiations on both sides thereof with the result that they are quickly cooked and furthermore are in most prepared palatable condition.

It is a further object of the invention to provide in combination with the above an improved form of timing device for regulating the period through which the grid is held within the broiling chamber, this timing device being of simple construction and having a minimum number of parts in operation, thus being free from necessity of frequent adjustment.

Referring to the drawings which are for illustrative purposes only:

Fig. 1 is a longitudinal vertical section through the device of the character described, this section being taken substantially upon the plane represented by the line 1—1 of Fig. 2.

Fig. 2 is a section taken on a plane represented by the line 2—2 of Fig. 1.

Fig. 3 is a section taken on a plane indicated by the line 3—3 of Fig. 1.

Fig. 4 is an enlarged fragmentary section corresponding to the lower left hand corner of Fig. 1, showing the timing mechanism in detail.

Fig. 5 is an enlarged plan view looking downwardly upon the top of the piston employed in the timing device.

Fig. 6 is an enlarged elevational view of the latch member taken as indicated by the arrow 6 of Fig. 1.

Fig. 7 is a fragmentary sectional view taken on a plane indicated by the line 7—7 of Fig. 6.

Fig. 8 is an enlarged fragmentary section on a plane represented by the line 8—8 of Fig. 1.

Fig. 9 is an elevation looking toward Fig. 8 as indicated by the arrow 9.

In the form of the invention shown in the drawings, end walls 11, Fig. 1, side walls 12, Fig. 2, and a top wall 13 are arranged to enclose a chamber which is open at the bottom as indicated at 15. The walls are preferably formed of a low heat conductive material such as a mixture of diatomaceous earth and Portland cement enclosed in a sheet metal housing 16 which is mounted upon a frame work or supporting structure 17 employing angle iron legs 18 and interconnecting members 19. In a pair of vertically placed channels 21 and 22 placed at each end of the supporting frame work 17, the downwardly turned ends 23 of a bar 24 are vertically slidable. The bar 24 in combination with upwardly directed brackets 25 constitutes a vertically movable carriage which supports a grid 27 arranged to receive the steaks or other cuts of meat to be broiled. This grid consists of a base member 28 comprising a bar having the ends 29 thereof bent upwardly and pivoted on pins 30 to the upper ends of the brackets 25. As shown in Fig. 8, vertical holes 32 and 33 are drilled near the upwardly turned ends thereof and are arranged to receive the side rods 34 of a rigid grid element 35. In Fig. 8, the side rod 34 is shown in the opening 32 which is nearest the edge 36 in order that a meat cut of considerable thickness will be held centralized as will be hereinafter fully explained. At each end of the base bar 28, a rack 38 is placed, this rack having upwardly directed notches 39 arranged to receive the lower bar 40 of the back grid element 41 which grid element is arranged so as to be swingable upon its lower rod 40 in a manner permitting the placement and removal of the articles to be cooked.

It will be recognized that by placing the lower rod 40 in the various notches 39, the spacing of the grid elements may be adjusted to correspond to the thickness of the meat cut which is to be broiled. If a very thin cut is to be broiled, the side rods 34 of the rigid grid element 35 are placed in the holes 33, Fig. 8, thus bringing the grid element 35 near the central plane of the carriage. Downwardly extending from the leftward end of the grid base 28 is a guide arm 42, the end 43 of which projects leftwardly into a guide channel 44 which has a vertical extending portion 45 placed adjacent to the channel 21 and an outwardly projecting lower end portion 46 which curves upwardly on substantially the radius defined by the arm 42. When the carriage 24 is in its lowermost position, the end 43 of the arm 42 may swing outwardly in the portion 46, Fig. 2, of the channel 44, thus allowing the grid member to swing forwardly into a horizontal position as indicated by the dotted lines 48.

As shown in this figure, the upper bar 49 of the forward grid element 35 is equipped with a latch member 50 at each end thereof, these latch members being provided with downwardly directed notches 51 arranged to engage the upper edge of the rearward grid element 41. By swinging the members outwardly as indicated by the dotted lines 52, the swingable grid element may be swung upwardly as indicated by the arrow 53, thus opening the grid member so that access to the space intervening between the grid elements is attained.

As shown in Fig. 8, the lower rod 40 of the grid element 41 is locked in the notches 39 by latch members 55 which are pivoted at 56 to the ends 29 and are equipped with slots 57 at their lower ends which extend over the rod 40 from a lateral direction. The latch members 55 are somewhat semi-circular in form and the pivot 56 so located that the mass of the latch will be eccentrically exposed, thus incurring in the latch member a tendency to swing toward the left, thus holding the latch in place over the rod 40. After the grid 48 has been filled with meat to be broiled, a pull is exerted upon a ring 60 which is secured to a chain 61 extending to the arm 42, thus rotating the arm downwardly and swinging the grid member 48 upwardly into vertical position. By raising the lift member 63, the carriage is then slid upwardly in the channels 21 and 22, the end 43 of the arm 42 sliding upwardly in the vertical portion 45 of the guide channel 44, thus maintaining the grid member 38 in vertical position throughout the time it is raised above the extreme downward position. When an upward pull is exerted on the leftward end of the carriage causing it to move upwardly, a tension is placed in a chain member 65 which is secured at 66 and extends over pulleys 67, 68, and 69, through a vertical pipe 63′, Fig. 1 and is attached at 70 to the righthand end of the carriage, therefore causing the righthand end of the carriage to be lifted at the same rate of speed as the lefthand end so that binding of the members 23 in the slide channels 21 and 22 is prevented. At a point 73, a chain 74 is secured to the carriage, this chain extending over a pulley 75 as shown in Figs. 1 and 4 from which pulley 75 it extends downwardly around a small pulley 76 and upwardly to a stationary bracket 77. The pulley 76 is rotatably held between the outer plates 78 of a vertically movable latch member 79 which is equipped with a pawl 80 as shown in Fig. 4. As the carriage 24 is raised, the loop of the chain 74 which extends over the pulley 76 is lengthened due to the moving upwardly of the end of the chain which permits the chain to pass leftwardly over the pulley 75, and the member 79 drops downwardly and assumes the position indicated by the dotted lines 83. When the carriage 24 is fully raised, the point 84 of the pawl member drops under a latch dog 85 and rests against a ball bearing 86 set therein, thus preventing upward movement of the member 79 and holds the carriage 24 in raised position.

The timing means which I employ incorporates an outer housing 87 which is preferably cylindrical in form. Downwardly extending from the cap 88, situated at the upper end of the housing 87 is a sleeve 89 in which there extends a shaft 90 provided with a lever 91 at the upper end and a piston 92 at its lower end, upon the upper end of which piston there rests a circular plate 93. The invention employs a cylinder 94 having a bottom 95 and an opening 96 at the upper end thereof, this cylinder extends upwardly over the piston 92 and the upper end thereof is closed by a ring member having a covered opening 97 therein. The plate 98, Fig. 7, of the member 79 extends inwardly through a vertical slot 99 in the housing 87 and is equipped with a vertically extending pin 100 which rests upon the inner end 101 of the member 80. When the cylinder 94 is in engagement with the member 79, the pin 100 forces the end 101 downwardly as shown in full lines in Figs. 1 and 4 against the action of the spring 103. The cylinder 94 is filled with a liquid preferably water, to a point near the top, thus forming an air seal between the piston 93 and the cylinder 94.

When the carriage 24 is raised and the member 79 drops away from the lower end of the cylinder 94 and assumes the position indicated by the dotted lines 83, Fig. 4, the weight of the cylinder 94 creates a vacuum in the space 107 between the piston 92 and the bottom 95 of the cylinder, the cylinder then being supported by the upwardly acting external air pressure. As shown in Fig. 5, the piston 92 is equipped with a series of graduated holes 108 and 109 and the plate 93 is notched as indicated at 110 so that one of the holes 108—109 may be uncovered as indicated at 111. The water contained above the piston within the cylinder 94 flows downwardly through the opening 111, thus partially relieving the vacuum in the chamber 107 which permits the piston to advance downwardly, this downward advance being at a rate of speed controlled by the flow of water from the upper side of the piston 92 of the chamber 107. The lever 91 on the upper end of the shaft 90 may be manipulated by use of the handle 112 in a manner to rotate any of the holes 108—109 into position cooperating with the notch 110 of the plate 93, which plate is held against rotation by the extension of projections 113 into notches 114 provided at the lower end of the sleeve 89. When the cylinder approaches the lower end of its downward movement, the pin in the position indicated by dotted lines 115 is engaged by the bottom 95 and forced downwardly against the end 101 with the result that the point 84 of the pawl 83 is swung leftwardly out of engagement with the stop member 85, thus releasing the member 79 and allowing the carriage 24 to drop into lowered position. By the shortening of the chain which extends over the pulley 76, the member 79 is raised and lifts with it the cylinder 94 forcing the water from the chamber upwardly through the holes 108—109 and holes 119 in the piston 92, the plate 93 at this time being slidably raised.

It will be recognized that the speed of drop of the carriage 94 is gauged entirely by the rate of reverse flow of liquid through the piston. In view of the fact that the cylinder 94 is entirely closed at its lower end, there is no possibility of water leakage. The loss of water due to evaporation is very small owing to the fact that the float 102 covers nearly the entire surface of the water; however, any loss of water may be made up from time to time by injecting a small amount through the opening 97.

In Fig. 2, it will be noticed that the side walls 12 slope inwardly as they progress upwardly. In front of these walls 12 are placed incandescible plate members 120 provided with a large number of evenly spaced small openings 121, thus producing a foraminous condition of the plates 120. It is preferable that these plates be made up of small sections 122 of sheet nichrome steel having inwardly turned flanges 124 which serve as stiffening means for the separate sections 122, thus preventing the bulging of the foraminous radiating element under action of heat from flames 125 thrown upwardly between the plates 121 and the walls 12 by longitudinal burners 127 which extend inwardly in the ends of the device and are fed with gas from supply pipes 128 equipped with valves 129. By the particular construction employed, an even heating of the plates 120 to a state of incandescence is accomplished, thus causing the plate to emit incandescent heat rays which have very pronounced power of penetration. The penetrating effect of these heat rays results in the carrying of a high temperature into the body of the meats held in the grid 28 for cooking, with the result that an even cooking throughout without scorching of the outer surface is attained, and causing a great rapidity of cooking action such as described in the preamble to this specification.

It will be perceived that the lower edges 130 of the plates 120 are spaced apart from the walls and that there is a relative sloping together of the plates and the walls due to the inward slope of the walls. The flames 125 are thrown upon the inner faces of the plates 120 and as they pass upwardly are crowded by the converging of the plates 120 and the walls 12 so that portions of the combusting gases are caused to pass out through the foraminous openings 121. By converging the members as shown, the crowding of the combusting gases outwardly through the plates is very thoroughly distributed across the area of the plate producing the heating of the solid areas between the openings 121 to an incandescent state with the result that penetrative heat rays of the character described are produced. It is upon the wedge of combustion principle that the very efficient cooking action greatly depends, as by the use thereof an incandescent condition similar to that of hot coals in a barbecue grate is attained.

I claim as my invention:

1. In a cooker, the combination of: walls forming a cooking chamber having an opening in the lower wall thereof: a carrier; substantially vertically extending guide means for directing said carrier between lowered position beneath said chamber and raised position within said chamber; and means for causing and controlling a gradual egression of said carriage from said cooking chamber.

2. In a cooker, the combination of: walls forming a cooking chamber having an opening in the lower wall thereof: a carrier; substantially vertically extending guide means for directing said carrier between lowered position beneath said chamber and raised position within said chamber; a retaining member for holding said carrier in raised position; and means for causing and controlling a gradual egression of said carriage from said cooking chamber.

3. In a cooker, the combination of: walls forming a cooking chamber narrowing toward its top and having a downwardly looking opening through a substantially horizontal bottom wall: a carrier; substantially vertically extending guide means for directing said carrier between lowered position beneath said chamber and raised position within said chamber.

4. In a cooker, the combination of: walls forming a cooking chamber having an opening in the lower wall thereof: a carrier; a grid member on said carrier arranged to swing between vertical and horizontal positions; and substantially vertically extending guide means for directing said carrier between lowered position beneath said chamber and raised position within said chamber.

5. In a cooker, the combination of: walls forming a cooking chamber narrowing toward its top and having a downwardly looking opening through a substantially horizontal bottom wall: a carrier; a grid member on said carrier arranged to swing between vertical and horizontal positions; and substantially vertically extending guide means for directing said carrier between lowered position beneath said chamber and raised position within said chamber.

6. In a cooker, the combination of: walls forming a cooking chamber having an opening in the lower wall thereof: a carrier; and substantially vertically extending guide means for directing said carrier between lowered position beneath said chamber and raised position within said chamber; foraminous incandescible members arranged on each side of the position of said carrier in said chamber; and means for heating said members to incandescence.

7. In a cooker, the combination of: walls forming a cooking chamber having an opening in the lower wall thereof: a carrier; and substantially vertically extending guide means for directing said carrier between lowered position beneath said chamber and raised position within said chamber; foraminous incandescible members arranged on each side of the position of said carrier in said chamber; and means for heating said members to incandescence.

8. In a cooker, the combination of: walls forming a cooking chamber, having an opening in the lower wall thereof: a carrier, a grid member on said carrier arranged to swing between vertical and horizontal positions; and substantially vertically extending guide means for directing said carrier between lowered position beneath said chamber and raised position within said chamber; incandescible members arranged on each side of the position of said carrier in said chamber; and means for heating said members to incandescence.

9. In a cooker, the combination of: walls forming a cooking chamber having an opening in the lower wall thereof: a carrier; and substantially vertically extending guide means for directing said carrier between lowered position beneath said chamber and raised position within said chamber; foraminous incandescible members arranged on each side of the position of said carrier in said chamber, said incandescible members each consisting of a foraminous plate spaced apart from the adjacent wall at the lower edge and sloping substantially into contact at the upper edge thereof; and a burner arranged to throw a flame upwardly between each of said plates and its co-operating wall.

10. In a cooker, the combination of: walls forming a cooking chamber having an opening in the lower wall thereof: a carrier; and substantially vertically extending guide means for directing said carrier between lowered position beneath said chamber and raised position within said chamber; and a retaining member for holding said carrier in raised position; foraminous incandescible members arranged on each side of the position of said carrier in said chamber, said incandescible members each consisting of a foraminous plate spaced apart from the adjacent wall at the lower edge and sloping substantially into contact at the upper edge thereof; and a burner arranged to throw a flame upwardly between each of said plates and its co-operating wall.

11. In a cooker, the combination of: walls forming a cooking chamber having an opening in the lower wall thereof; a carrier; a grid member on said carrier arranged to swing between vertical and horizontal positions; and substantially vertically extending guide means for directing said carrier between lowered position beneath said chamber and raised position within said chamber; incandescible members arranged on each side of the position of said carrier in said chamber, said incandescible members each consisting of a foraminous plate spaced apart from the adjacent wall at the lower edge and sloping substantially into contact at the upper edge thereof; and a burner arranged to throw a flame upwardly between each of said plates and its co-operating wall.

12. In combination in a cooker having a movable carriage: a member secured at one end thereof near one end of said carriage, said member passing to above the other end of said carriage and being extended downwardly and attached thereto in such a manner that a movement in the first mentioned end of said carriage will be transferred to the second mentioned end of said carriage, causing them to move upwardly together.

13. In combination in a cooker having a movable carriage: a member secured at one end thereof near one end of said carriage, said member passing to above the other end of said carriage and being extended downwardly and attached thereto in such a manner that a movement in the first mentioned end of said carriage will be transferred to the second mentioned end of said carriage causing them to move upwardly together; and a lifting member secured to and extending above the first named end of said carriage.

In testimony whereof, I have hereunto set my hand at Los Angeles, California, this 10th day of January, 1924.

HOWARD S. MURRAY.